United States Patent
Poletti et al.

(10) Patent No.: US 10,097,461 B2
(45) Date of Patent: Oct. 9, 2018

(54) METHOD AND DEVICE FOR DETECTING CONGESTION ON A TRANSMISSION LINK

(75) Inventors: Claude Poletti, Fontenay aux Roses (FR); Marc Cartigny, Chatou (FR); Olivier Klotz, Vincennes (FR)

(73) Assignee: AIRBUS DEFENCE AND SPACE SAS, Toulouse (FR)

(*) Notice: Subject to any disclaimer, the term of this patent is extended or adjusted under 35 U.S.C. 154(b) by 577 days.

(21) Appl. No.: 13/881,503

(22) PCT Filed: Oct. 21, 2011

(86) PCT No.: PCT/EP2011/068439
§ 371 (c)(1),
(2), (4) Date: Jul. 15, 2013

(87) PCT Pub. No.: WO2012/055783
PCT Pub. Date: May 3, 2012

(65) Prior Publication Data
US 2014/0146694 A1    May 29, 2014

(30) Foreign Application Priority Data
Oct. 27, 2010 (FR) ..................... 10 04220

(51) Int. Cl.
*H04L 12/801* (2013.01)
*H04L 12/54* (2013.01)

(52) U.S. Cl.
CPC .......... *H04L 47/11* (2013.01); *H04L 12/5602* (2013.01); *H04L 47/115* (2013.01)

(58) Field of Classification Search
CPC ............... H04L 12/5602; H04L 47/115; H04L 47/11–47/40
See application file for complete search history.

(56) References Cited

U.S. PATENT DOCUMENTS 6,212,188 B1 * 4/2001 Rochberger ........ H04L 12/5602
370/351
7,617,288 B2 * 11/2009 Beyer ................... H04L 1/0002
709/208
7,948,886 B2 * 5/2011 Chakareski ............. H04L 47/10
370/231

(Continued)

OTHER PUBLICATIONS

Document transmitted by the International Bureau in International Application No. PCT/EP2011/068439 filed Oct. 21, 2011; PCT/IB/338 (Notification of Transmission).

(Continued)

*Primary Examiner* — Ian N Moore
*Assistant Examiner* — Latresa McCallum
(74) *Attorney, Agent, or Firm* — Nixon & Vanderhye, PC (57) ABSTRACT

Detection of the congestion on a link based on an exchange of messages between a sender and a receiver, one sender and several receivers or several senders and one receiver. This equipment is connected to the ends of a transmission channel. One of the items of equipment is designated as the master and the others slaves. These exchanges are aimed at enabling the master to calculate and compare the rate of the data send and the rate of the data received. A divergence in the rates calculated reveals a congestion on the link. All these exchanges are made in the application layer and therefore do not involve the underlying layers.

7 Claims, 4 Drawing Sheets

(56) References Cited

U.S. PATENT DOCUMENTS

| | | | |
|---|---|---|---|
| 2003/0067872 A1 | 4/2003 | Harrell et al. | |
| 2006/0182065 A1* | 8/2006 | Petrovic | H04L 47/12 370/332 |
| 2007/0211631 A1* | 9/2007 | Rahman | H04L 69/164 370/230 |
| 2008/0040501 A1* | 2/2008 | Harrang | H04L 1/0002 709/232 |
| 2008/0071899 A1* | 3/2008 | Odaka | H04L 41/06 709/223 |
| 2009/0196173 A1* | 8/2009 | Wang | H04W 72/0486 370/230 |
| 2010/0165840 A1* | 7/2010 | Khan | H04L 43/0829 370/232 |
| 2010/0173594 A1* | 7/2010 | Stettler | H04B 1/715 455/77 |
| 2010/0254262 A1* | 10/2010 | Kantawala | H04L 12/56 370/232 |
| 2010/0260043 A1* | 10/2010 | Kimmich | H04L 1/0003 370/229 |

OTHER PUBLICATIONS

Document transmitted by the International Bureau in International Application No. PCT/EP2011/068439 filed Oct. 21, 2011; PCT/IB/373 (Preliminary Examination Report).

Document transmitted by the International Bureau in International Application No. PCT/EP2011/068439 filed Oct. 21, 2011; PCT/ISA/237 (Written Opinion of the International Searching Authority, with translation).

Document transmitted by the International Bureau in International Application No. PCT/EP2011/068439 filed Oct. 21, 2011; PCT/IB/306 (Notice of Change of Address).

Benmohamed et al., "Feedback Control of Congestion in Packet Switching Networks: The Case of a Single Congested Node", *IEEE/ACM Transactions on Networking*, vol. 1, No. 6, Dec. 1, 1993, pp. 693-708.

International Search Report for PCT/EP2011/068439, dated Dec. 13, 2011.

Written Opinion of the International Searching Authority for PCT/EP2011/068439, dated Dec. 13, 2011.

\* cited by examiner

METHOD AND DEVICE FOR DETECTING CONGESTION ON A TRANSMISSION LINK

This application is the U.S. national phase of International Application No. PCT/EP2011/068439 filed 21 Oct. 2011 which designated the U.S. and claims priority to FR Patent Application No. 10/04220 filed 27 Oct. 2010, the entire contents of each of which are hereby incorporated by reference.

The present invention concerns the field of the detection of congestion on a transmission link in a communication network.

Modern communication networks consist of a plurality of communication nodes connected together by communication links. These communication nodes comprise terminal equipment such as computer stations, mobile communication terminals or application servers. These nodes also comprise intermediate equipment such as relays, and routers that serve for interconnecting and routing the data traffic between the terminal equipment.

The communication links are based on highly diverse physical transmission technologies. Cable technologies such as optical fibre, Ethernet links or the like and radio technologies according to a wide range of protocols such as WiFi, WiMax, satellite links or the like can be cited. Each of these technologies leads to different properties concerning the transmission channel used both in terms of available bandwidth, error rate or variability of this available bandwidth. At the present time, the dominant technology is a packet communication technology, typically the IP (Internet Protocol) network.

These communication networks serve to implement a great diversity of services, such as voice communication exchange, typically co-called VoIP (Voice over IP) services, the broadcasting of multimedia programs, typically television services or services giving access to radio on demand or access to data, typically access to web services.

These applications have bandwidth requirements, and a latency that depends on the application. Packet transfer networks do not historically guarantee a given bandwidth or latency to a particular service. On the other hand, circuit communication networks are based on the establishment of a communication circuit between the communicating end equipment that guarantees a bandwidth and latency between these items of equipment as soon as the circuit is established. One example of such circuit networks is the switched telephone network.

To allow the development of services having constrained requirements in terms of bandwidth and/or latency on packet communication networks, a set of technologies have been developed and are known by the term QOS (Quality Of Service). These technologies are based on the definition of a set of service categories according to the communication constraints. The network is partitioned into domains applying a quality of service policy. The data packets entering the domain are marked according to the category of the service sending them (colouring), the data flows are accepted or refused at the input, and their rate may be regulated (policing). Priorities are attributed to the various categories and the intermediate items of equipment in the network, which deal with a congestion using these priorities in order to limit the packets with the lowest priority and favour the transmission of the packets belonging to the data streams with the highest priorities.

The physical links that are the most tricky to manage are radio links. A bidirectional radio communication link is typically implemented by two monodirectional radio links, each monodirectional link using a particular frequency or frequency range. These radio links are subject to high variations in their bandwidth according to their environment, and are subjected to attenuation, interference or the like that dynamically degrades their transmission capacities.

Radio adaptation mechanisms known as radio link adaptation have been developed. These mechanisms generally function at the physical link or the MAC (Media Access Control) layer. These mechanisms have a rapid reaction time and are not linked to the application level quality of service mechanisms. In particular it is not possible to act on the service admission control policy at the terminals of a quality of service domain using these mechanisms without uploading information from the physical link or its MAC layer to the application layer managing these service admission mechanisms. Their reaction time is typically too quick for interaction with the quality of service mechanism. They typically serve only to designate the priority packets from those that may be lost during congestion.

The invention aims to solve the above problems by a mechanism for detecting the congestion of a transmission link. This mechanism is managed by the application lying between one or more data senders and one or more receivers. It is therefore independent of the physical equipment manufacturers and MAC of the lower layers. It consists of measuring the rate leaving the sender and the rate entering the receiver or receivers over a defined period. These rates are exchanged at the end of each period. A difference in these rates reveals congestion. The information is uploaded to the service admission mechanism.

The invention concerns a method of detecting the congestion on a transmission link, the transmission link comprising two ends, one or more items of so-called terminal equipment or nodes being connected to each end, at least one end comprising only one item of equipment, which comprises a step of determining a computing period; a step of determining a master and one or more slaves among the equipment connected to the ends of the transmission link, the master always being the single item of equipment at one end of the link; a step of computing by each item of equipment the data rate sent or received during each period in the application layer of said equipment; a step of sending, at the end of each period, a request by the master intended for the slave or slaves comprising the rate calculated by the master for the previous period in the form of a message in the application layer; a step of comparing, in the application layer, the rates sent and received at the two ends of the link and a step of determining, in the application layer, congestion when the rate received at one of the ends is less than the rate sent at the other end.

According to a particular embodiment of the invention, the method also comprises a step of sending, by each slave, when the request is received from the master, a response including the rate sent or received by said slave during the previous period in the form of a message in the application layer.

According to a particular embodiment of the invention, the method also comprises sending a message acknowledging by the master the response or responses received in the form of a message in the application layer.

According to a particular embodiment of the invention, the method also comprises, the slave also being the only one at its end of the link, the comparing step being performed by the slave, a step of sending by the slave, when the request is received by the master, a response comprising the rate sent or received by said slave during the previous period when a congestion is determined, in the form of a message in the application layer.

According to a particular embodiment of the invention, the method also comprises a step of calculating the round trip time when a response is received by the master or an acknowledgement message by a slave, a gradual extension of this time making it possible to predict a congestion.

According to a particular embodiment of the invention, the method also comprises a step of detecting the loss of an intermediate link when there still exists a path between the sender and the receiver by a sudden extension of the round trip time.

The invention also concerns a method of managing the quality of service, characterised in that it comprises a step of determining the admission of the services at the boundaries of a quality of service domain according to a determination of the congestion of at least one link as described previously.

The invention also concerns an item of equipment connected to one end of a transmission link, a computing period being defined, which comprises, within the application layer, means for calculating the data rate sent or received during each period; means for sending, at the end of each period, a request intended for the item or items of equipment connected to the other end of the link, comprising the rate calculated for the previous period; means for comparing, in the application layer, the rates sent and received at the two ends of the link and means for determining congestion when the rate received at the one of the ends is less than the rate sent at the other end.

The features of the invention mentioned above, as well as others, will emerge more clearly from a reading of the following description of an example embodiment, said description being given in relation to the accompanying drawings, among which.

The example embodiment of the invention is given in the context of a data transmission over a satellite link. However, the invention can be used in the context of any transmission link technology.

Figure 1:
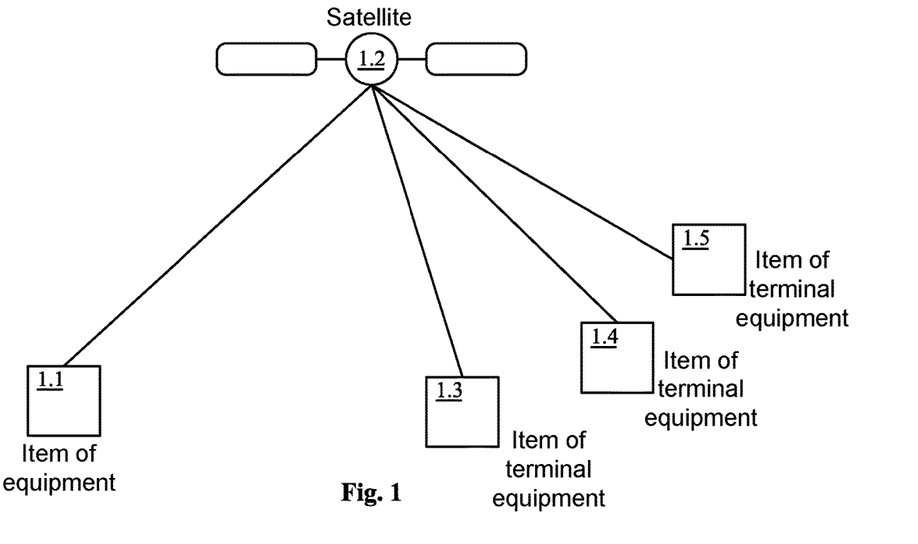
FIG. 1 illustrates the general architecture of an example embodiment of the invention.

FIG. 1 illustrates the general architecture of a transmission by satellite. Typically an item of equipment 1.1 sends streams corresponding to one or more services to one or more items of terminal equipment 1.3, 1.4 and 1.5. The transmission is relayed by a satellite 1.2. This type of transmission has the following features. The transmission takes place by radio, and the transmission channel is therefore subject to interference due among other things to the weather. The available bandwidth is therefore variable over time.

This transmission often involves equipment of the network head type, here the equipment 1.1, and a variable number of items of terminal equipment. There is therefore a communication from one to several and in return communication from several to one. However, the case of a single sender and single receiver is also normal. The case of one to several and even in return from one to several is also normal.

The concern is more particularly with the transmission of services over the satellite link. These services have different properties. Some services have a requirement of a guarantee of available bandwidth. The examples of voice exchanges over IP, services emulating the establishment of a circuit such as telephone exchanges, or the broadcasting of encoded video programmes at constant rate or not can be cited. All these services are real time and will cease to function as soon as the available bandwidth becomes less than the necessary bandwidth.

These services are admitted or not at the input of the quality of service domain according to the available bandwidth. This calculation of the bandwidth is based on a theoretical capacity of the transmission link. When the transmission channel is disturbed, this capacity may become less and the service admission policy becomes inconsistent with the capacities actually available.

In the absence of adjustment of the admission policy, the loss of packets will impact on the various services and they will possibly all cease to function. On the other hand, an adjustment to the admission policy will designate a service to be interrupted, enabling the other services to continue to function normally. The choice of service is managed by the quality of service policy and does not fall within the scope of this document.

Figure 2:
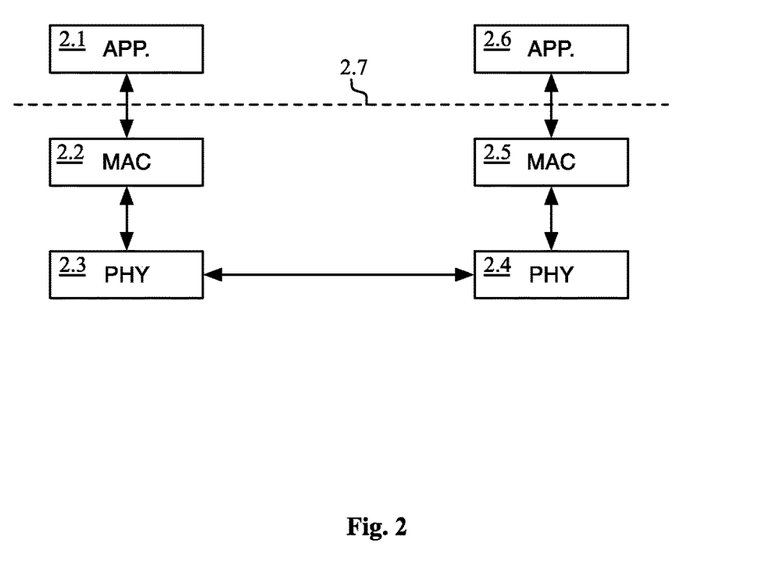
FIG. 2 illustrates the typical layer architecture of a communication link.

FIG. 2 illustrates the layer architecture of a communication link between a sender and a receiver. On both sides of the transmission, the data exchange takes place between two application modules 2.1 and 2.6. These application modules are implemented on any network equipment, one of the items of equipment being the data sender from the application layer and the other the data receiver for the application layer. On each item of equipment, the data packets to be transmitted are passed to a lower layer responsible for controlling access to the link 2.2 and 2.5, the MAC layer. The latter then passes the data packets to the physical layer 2.3 and 2.4, which effects the physical exchange of the data over the link. Optionally intermediate equipment such as relays or routers act in addition to the MAC level and the physical level between the terminal equipment. These intermediate items of equipment are invisible to the application layer. We therefore have a link at the application level, congestion on which it is sought to detect, and equipment connected to the ends of this link at the application level. This link at the application level can be composed of one or more links at the MAC or physical level connected by intermediate items of equipment that do not interact with the application layer.

Mechanisms for managing the quality of service, including in particular the policy for admission of a new service at the boundaries of the quality of service domain, are typically implemented in the application layer. For example, when a new telephone communication is established, it is there that a decision is taken to admit the communication or not depending on the theoretical capacities of the links involved in the communication. The same applies to a request from terminal equipment for the broadcasting of a real-time multimedia service such as the vision of a video.

The invention is based on an exchange of messages between a sender and a receiver, one sender and several receivers or several senders and one receiver. These items of equipment are connected at the ends of a transmission channel. This is restricted to the case where at least one end of the radio link comprises only a single item of equipment. One of the items of equipment is designated as the master and the other slaves. The master is always the single item of equipment at one end of the link. These exchanges aim to synchronise the measurements of the master and of the slave or slaves connected and aims to enable the master to calculate and compare the rate of the data sent and the rate of the data received. A divergence in the rates calculated reveals a congestion on the link. All the exchanges are made in the application layer and therefore involve no breach in any security policy between the application layer and the underlying layers that might have a lower security level. In such a case, typically a boundary 2.7 creates a security partitioning between the physical and control layers of the link and the application layer.

Figure 3:
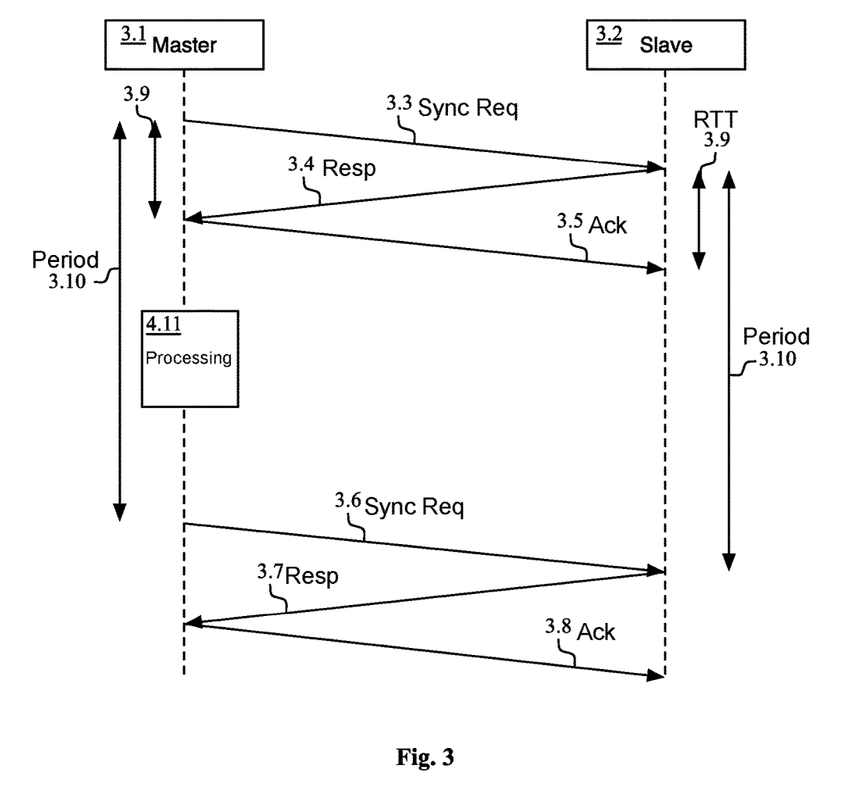
FIG. 3 illustrates the exchange of messages in an example embodiment of the invention in the case of a sender and a receiver.

FIG. 3 illustrates a first embodiment between a sender and a receiver. This is the case of a point to point transmission link. In this example, the end 3.1 is designated as the master while the end 3.2 is designated as the slave. It will be noted that the roles of the two ends may be reversed without modification of the method. The master can therefore be the sender or the receiver. A period 3.10 is defined. The master sends a synchronisation request 3.3 that advantageously includes the rate sent or received by itself during the previous period to the slave. It will be understood that it is here possible to transmit, for example, the quantity of data transmitted during the period instead of the rate expressed in bytes or number of packets. The calculation of the rate is therefore done by the other end.

When the slave receives this request, it advantageously responds with a message 3.4 that includes the rate sent or received by itself during the same period. The response is advantageously acknowledged by the master in the form of an acknowledgement message 3.5. By means of the rate information from the other end, the master is in a position to carry out processing 4.11 in order to determine whether or not the link is congested. Alternatively, this treatment can be done by the slave, which has the same information. This treatment aims to compare the rate values and to determine a state of congestion when the rate received becomes less than the rate sent beyond a fixed threshold. This congestion information can then be uploaded to the quality of service manager in order to be used advantageously in the policy for admission of the services at the boundaries of the domain.

The request, the response and the acknowledgement are sent in the form of messages in the application layer.

Advantageously, the period 3.10 is chosen so as to be consistent with the cycles of the system managing the quality of service policy. Typically it is around one to a few seconds. It is predetermined, but can advantageously be modified by the master by introducing a new period value in the request. The change is then acknowledged by the slave in its response message.

Advantageously, the message exchange allows a measurement of the round trip time RTT 3.9 between the ends of the link. This measurement can be made by the master by measuring the time between the sending of the request 3.3 and the reception of the message 3.4 or by the slave by measuring the time between the sending of the message 3.4 and the reception of the acknowledgement 3.5. This measurement makes it possible to refine the rate calculations by taking account of the transmission latency between the sender and receiver. It also makes it possible to predict the appearance of congestion since typically the latency increases gradually before the rate measurements afford a measurement of the congestion.

Another use of the information on the travel time is the detection of the loss of an intermediate link when there still exists a path between the sender and the receiver. If other paths do not exist, the two ends of the link detect the drop in the link by noting the cessation of the exchanges. On the hand, the same does not apply in the case where the link is not broken. This is because, if an intermediate path becomes inoperational, the traffic will take a different path having a number of intermediate links that are typically higher and therefore a greater latency whereas the rate may be sufficient not to impact on the rate measurements. This typically results in a sudden extension of the round trip time. Measuring the latency therefore makes it possible to detect the occurrence of these problems. This is desirable since, for example, if it is a case of satellite links, the stream may be caused to make two round trips as far as the satellite, which is not always desirable from the economic point of view.

At the end of the period 3.10, the exchange of messages is reproduced identically to the messages 3.6, 3.7 and 3.8. A break of the link is detected by the two ends by an interruption of these exchanges.

Figure 4:
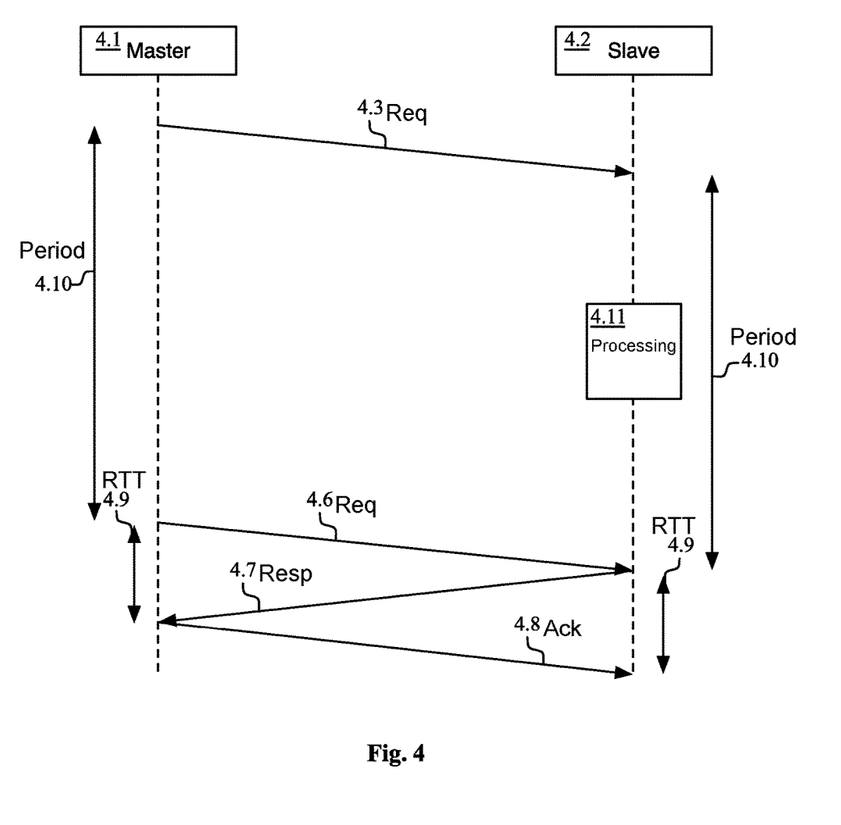
FIG. 4 illustrates the exchange of the messages in another example embodiment in the case of a sender and a receiver.

FIG. 4 illustrates a second embodiment of the invention. In this variant, it is the slave that compares the rate received by the master with its own rate. As long as the rates correspond, it does not respond to the request 4.3. It is only when a divergence appears between the rates that it responds to the request 4.6 with a response message 4.7, said response being acknowledged by the message 4.8.

This variant makes it possible to save on bandwidth by reducing the traffic generated by the congestion detection protocol and enables these exchanges to be implemented as an option of an existing protocol. On the other hand, it becomes impossible for the master to detect a loss of the connection on the absence of a response from the slave since the slave does not routinely respond to the request messages. This is not necessarily a problem since such a loss can be detected by the slave on the absence of messages 4.3, 4.6 on a cyclic basis defined by the period 1.10. Likewise, the calculation of latency by calculating the round trip time 4.9 is possible only when there is congestion.

Advantageously, the synchronisation message 4.3, 4.6 can be included in the message maintaining the connection (keep-alive-routing message) of the routing protocol used, for example OSPF.

Figure 5:
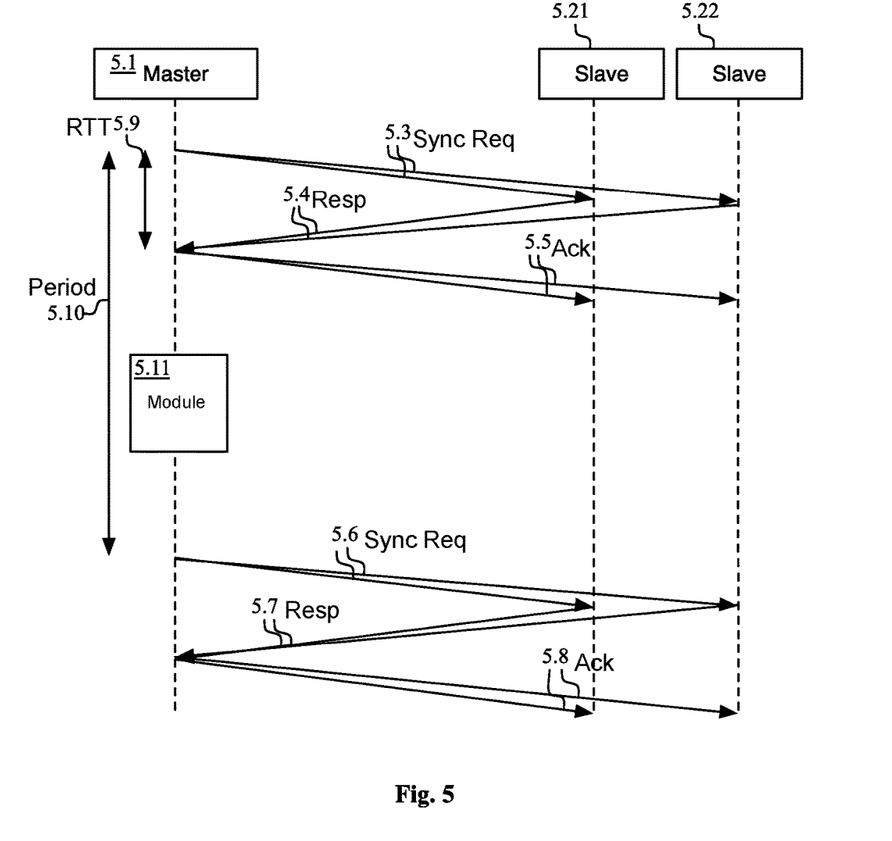
FIG. 5 illustrates the exchange of messages in an example embodiment in the case where the sender or receiver is multiple.

FIG. 5 illustrates an embodiment of the invention in the case of a transmission link between one point and several points. This connection can be made in one direction, point to multipoint, or in the other, multipoint to point, that is to say from one sender to several receivers or from several senders to one receiver. The case of several senders to several receivers is excluded here. The transmission channel is typically divided according to a time division of the TDMA (Time Division Multiple Access) type in the case of a multipoint to point transmission connection. The links that are studied here are typically monodirectional. These monodirectional links can be combined diversely in order to constitute bidirectional links. These topologies are to be taken into account for the admission of bidirectional services on the basis of the detection of congestion in both directions. A bidirectional link can also consist of two monodirectional links using the same physical link, typically the frequency, in a way that is interleaved in time. The analysis of a bidirectional link is therefore broken down into an analysis of congestion on monodirectional links.

The unitary end 5.1 is then designated as the master for the protocol. This protocol is here also implemented in the application layer or layer 3 of the transmission stack. Each of the multiple ends 5.21, 5.22 uses a slave module.

The master sends a request 5.3 to each of the slaves with its rate for the previous period. Each slave responds with a response message 5.4 containing its rate for the previous period. Advantageously, each of the responses is acknowledged by the master in the form of an acknowledgement message 5.5 to the slaves. As already presented herein, the message exchange is expected to be repeated after a period 5.10, which leads to a request 5.6, the to a response message 5.7 and a acknowledgement message 5.8.

The detection of congestion is then done by the module 5.11 by the master by comparison of its rate and the sum of the rates of the slaves. Here again the congestion information is advantageously transmitted to the quality of service management system in order to be used in the policy for admission of services to the boundaries of the domain.

Advantageously the same improvements on the basis of the calculation of the round trip time 5.9 are here possible.

In this way it is possible to detect the congestion on a link with a method functioning entirely on the layer 3 or application layer without having recourse to the physical and control layers of the link, layers 1 and 2. This mechanism has a parameterisable reaction time typically of an order of magnitude of seconds compatible with the management of the quality of service policy of a quality of service domain. A quality of service manager can therefore advantageously use the detection information thus calculated in order to maintain the consistency of the service emission policy in the domain. Thus the invention participates in the maintenance of the consistency in the broadcasting of real-time services requiring a constant bandwidth. It is therefore possible to cut a service and to avoid a degradation or even a breakdown of all the services when the bandwidth of a link is degraded.

The congestion detection can be made by category of service on the basis of the messages exchanged between the master and its slaves containing rate information by category of service. A quality of service manager can therefore advantageously use the detection information thus calculated by category of service in order to maintain the consistency of the service admission policy in the domain. Thus the invention participates in maintaining consistency in the broadcasting of real-time services requiring a constant bandwidth and in the broadcasting of non-real-time services. It is therefore possible to cut a service, real time or not, and to prevent degradation or even a breakdown of all the services when the bandwidth of a link is degraded.

Bidirectional communication between two nodes is based on the use of one transmission link per direction. A detection of congestion is then made per transmission link by a master and one or more slaves associated with this master. The congestion information of each congestion detection is advantageously transmitted to the quality of service management system in order to be used in the service admission policy at the boundaries of the domain.

The invention claimed is:

1. A method for detecting congestion on a transmission link, the transmission link having two ends, one or more items of equipment being connected to each end of said transmission link so that at least one of said ends has only one item of equipment connected thereto, the method comprising:
    determining a master and one or more slaves among the items of equipment connected to the ends of the transmission link, the master always being the item of equipment that is solely connected at one of the ends of the transmission link;
    exchanging data via said transmission link during a predetermined period;
    calculating, by each item of equipment, in application layer of said item of equipment, a data rate of data sent or received during the predetermined period via said transmission link;
    exchanging, at initiative of the master and at the end of the predetermined period, messages between the master to the at least one slave, so that at least one of the items of equipment gathers the data rates calculated by the master and by the at least one slave for the predetermined period, and wherein the exchanged messages are messages in application layer;
    determining, in application layer of the at least one of the items of equipment that gathers the data rates calculated by the master and by the at least one slave for the predetermined period, that a congestion occurs, when the data rate of data received at one of the ends of the transmission link is less than the data rate of data sent at the other end of the transmission link, wherein information representative of the data rate of data received or sent at one of the ends of the transmission link are included in the exchanged messages; and
    informing a quality of service management system, when a congestion occurrence via the transmission link has been determined, that said congestion has occurred, so that service admission at boundaries of a quality of service domain be adapted to the congestion occurrence,
    and further comprising:
    sending an acknowledgement message acknowledging, by the master, each response received, wherein the acknowledgement message is a message in application layer,
    calculating a round trip time, when successive responses are received by the master; and
    predicting that congestion occurs, when a gradual extension of the round trip appears between the successive response, wherein the gradual extension appears when the calculated round trip time continuously increases along the successive responses.

2. The method for detecting congestion according to claim 1, wherein the messages exchanged are as follows:
    sending, by the master, a request to the at least one slave;
    sending, by each slave, when the request is received from the master, a response to said request, wherein the request and each response are messages in application layer,
    and wherein the master determines whether congestion occurs from the data rate calculated by the master and further from the data rate calculated by the at least one slave, wherein said the data rate calculated by the at least one slave is contained in said response sent by said at least one slave.

3. The method for detecting congestion according to claim 1, wherein there is solely one slave at its end of the transmission link and the messages exchanged are as follows:
    sending, by the master, a request to the at least one slave; and
    sending, by each slave, when the request is received from the master, a response to said request, wherein the request and each response are messages in application layer,
    and wherein said slave determines whether congestion occurs from the data rate calculated by the master and further from the data rate calculated by said slave, wherein said data rate calculated by the master is contained in said request.

4. A method for managing quality of service, wherein the method comprises determining service admission at boundaries of a quality of service domain on the basis of determining congestion on at least one transmission link by applying, with respect to said at least one transmission link, the method for detecting congestion according to claim 1.

5. The method for detecting congestion according to claim 1, wherein there are plural slaves, and wherein the master performs:
  receiving from each slave a message including information of rate of data received from the transmission link by said slave or of data sent on the transmission link by said slave,
  performing a comparison of a sum of the rates of data received from the transmission link by the slaves with rate of data sent by the master on the transmission link, or a comparison of a sum of the rates of data sent on the transmission link by the slaves with rate of data received by the master from the transmission link, and
  determining that a congestion occurred when the comparison shows that the rate of data received at one of the ends of the transmission link is less than the data rate of data sent at the other end of the transmission link.

6. A method for detecting congestion on a transmission link, the transmission link having two ends, one or more items of equipment being connected to each end of said transmission link so that at least one of said ends has only one item of equipment connected thereto, the method comprising:
  determining a master and one or more slaves among the items of equipment connected to the ends of the transmission link, the master always being the item of equipment that is solely connected at one of the ends of the transmission link;
  exchanging data via said transmission link during a predetermined period;
  calculating, by each item of equipment, in application layer of said item of equipment, a data rate of data sent or received during the predetermined period via said transmission link;
  exchanging, at initiative of the master and at the end of the predetermined period, messages between the master to the at least one slave, so that at least one of the items of equipment gathers the data rates calculated by the master and by the at least one slave for the predetermined period, and wherein the exchanged messages are messages in application layer;
  determining, in application layer, that a congestion occurs, when the data rate of data received at one of the ends of the transmission link is less than the data rate of data sent at the other end of the transmission link; and
informing a quality of service management system, when a congestion occurrence via the transmission link has been determined, that said congestion has occurred, so that service admission at boundaries of a quality of service domain be adapted to the congestion occurrence,
wherein the messages exchanged are as follows:
  sending, by the master, a request to the at least one slave;
  sending, by each slave, when the request is received from the master, a response to said request, wherein the request and each response are messages in application layer,
and wherein the master determines whether congestion occurs from the data rate calculated by the master and further from the data rate calculated by the at least one slave, wherein said the data rate calculated by the at least one slave is contained in said response sent by said at least one slave,
and further comprising:
  calculating a round trip time, when successive responses are received by the master, and
  predicting that congestion occurs, when a gradual extension of the round trip appears between the successive responses, wherein the gradual extension appears when the calculated round trip time continuously increases along the successive responses.

7. The method for detecting congestion according to claim 6, further comprising:
  detecting the loss of an intermediate link, when there still exists a path between the items of equipment connected to the respective ends of said transmission link, by a sudden extension of the round trip time between the successive responses, wherein the sudden extension appears when the calculated round trip time increases by more than a predefined threshold along the successive responses.

* * * * *